United States Patent
Nakagawa et al.

[11] 3,837,939
[45] Sept. 24, 1974

[54] SOLID COMPOSITE PROPELLANT COMPOSITIONS CONTAINNG CARBOXY-TERMINATED POLYMERS

[75] Inventors: Toshio William Nakagawa, San Jose; Thomas P. Rudy, Saratoga, both of Calif.

[73] Assignee: United Aircraft Corporation, East Hartford, Conn.

[22] Filed: June 3, 1966

[21] Appl. No.: 554,966

Related U.S. Application Data

[63] Continuation-in-part of Ser. No. 375,648, June 16, 1964.

[52] U.S. Cl. .................................. 149/19, 149/20
[51] Int. Cl. ............................................. C06d 5/06
[58] Field of Search ............... 149/19, 20; 260/537

[56] References Cited
UNITED STATES PATENTS 3,041,216  6/1962  Bice ................................. 149/19
3,087,844  4/1963  Hudson et al. .................. 149/19
3,177,190  4/1965  Hsieh ........................... 149/19 UX

*Primary Examiner*—Benjamin R. Padgett
*Attorney, Agent, or Firm*—Steven F. Stone

[57] ABSTRACT

A composite solid propellant composition employing as the binder the reaction product of a crosslinking agent and a carboxy-terminated polymer having a backbone of recurring structural units having the general formula:

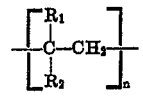

wherein $R_1$ and $R_2$ are selected from the group consisting of hydrogen and lower alkyl groups and $n$ is in the range of 4–250.

16 Claims, No Drawings

SOLID COMPOSITE PROPELLANT COMPOSITIONS CONTAINNG CARBOXY-TERMINATED POLYMERS

BACKGROUND OF THE INVENTION

This application is a continuation-in-part of our co-pending coassigned Pat. application Ser. No. 375,648, filed June 16, 1964.

This invention relates to new and useful compositions of matter and more particularly to solid combustible compositions having high energy content.

The combustible compositions of the present invention are suitable for a wide variety of applications where a solid, high-heat energy source is required. The solid exothermic formulations of the present invention are relatively soot-free and are readily castable in a wide variety of shapes making the material suitable for spot application of heat for such operations as field post and preheating of weld sections.

The hot gases resulting from combustion also make the formulations useful for application in gas and thrust generator systems. In addition, the binder employed in the formulations of the present invention is unusually inert to most oxidizers. For example, at ordinary temperatures certain reactive oxidizers attack and degrade conventional, unsaturated binders such as those based on polybutadiene. At elevated temperatures even conventional oxidizers such as ammonium perchlorate attack and degrade unsaturated binders. The combustible compositions of the present invention, however, employ a binder which resists the degradation and aging commonly experienced with ordinary binders. It is also possible, according to this invention, to formulate high performance propellants having burning rates substantially lower than hitherto obtainable which are useful in rocket applications wherein extended periods of terminal guidance and atmospheric drag are important design criteria.

It is an object, therefore, of the present invention to provide new and useful solid combustible compositions which are readily castable and, when burned, produce relatively soot-free combustion products.

It is another object of this invention to provide solid combustible compositions which do not appreciably age or degrade upon standing.

It is another object of this invention to produce low burning-rate propellants.

It is a further object of this invention to provide methods necessary to produce the unique solid combustible composition of the present invention.

Other and many of the attendant advantages will become more readily apparent from the following detailed description and discussion.

The foregoing objectives are realized by providing a unique binder in combination with conventional oxidizer constituents. The novel binder is produced by the proper synthesis and cross-linking of new and unique liquid polymers, hereinafter referred to as terminally carboxylated poly(mono-olefins) and preferably terminally carboxylated polyisobutylene, the synthesis of which will be set forth hereinafter in detail. In general, the physical characteristics of terminally carboxylated polyisobutylene are quite similar to those of the currently known binders. For example, such physical properties as tensile modulus and rupture stress of cross-linked compositions parallel quite closely the properties of comparable compositions prepared with carboxylated polymers of conjugated dienes such as 1, 3-butadiene and isoprene.

In order to prepare the exothermic mixtures of the present invention, a composition of the terminally carboxylated poly(mono-olefins) and a suitable cross-linking agent is loaded with suitable oxidizers of which ammonium perchlorate and ammonium nitrate are exemplary. The mixture is then mixed thoroughly and cured. In order that one skilled-in-the-art may practice the present invention, the following examples set forth in detail the method for formulating the exothermic mixtures of the present invention. It is to be understood that only pure, dry ingredients are suitable for the following formulations.

EXAMPLE 1

An exothermic mixture comprised substantially of terminally carboxylated polyisobutylene and ammonium perchlorate was prepared in accordance with the following recipe:

| | |
|---|---|
| Terminally carboxylated polyisobutylene, grams (equivalent weight 1081) | 10.0 |
| Ammonium perchlorate, grams (70 parts 180 micron, 30 parts 15 micron) | 33.0 |
| Tris[1-(2-methyl)aziridinyl]phosphine oxide, grams (equivalent weight 72.4) | 0.74 |

A 250 milliliter beaker was partially submerged in a heating bath and maintained at 68°C., tris [1-(2-methyl)aziridinyl]phosphine oxide was added and mixed thoroughly with the binder for the purpose of cross-linking. With stirring, ammonium perchlorate was added to the solution in 1 to 2 gram increments until all 33 grams of the ammonium perchlorate were added and thoroughly mixed therewith. The mixture thus formulated possessed a loading of 75.6 per cent weight of ammonium perchlorate.

The viscous mixture was then poured into a mold and cured for four days at 70°C, whereupon a solid grain was produced having the following properties:

| | |
|---|---|
| Tensile strength, psi (room temp.) | 139.8 |
| Elongation, per cent (room temp.) | 19.3 |
| Auto-ignition, degrees Fahrenheit | 520.0 |
| Impact sensitivity, kilogram centimeters (room temp.) | 36.0 |

The thus prepared exothermic mixture was then ignited in an open crucible and burned vigorously emitting heat, light and substantially soot-free gases.

EXAMPLE 2

A second formulation of terminally carboxylated polyisobutylene and ammonium perchlorate was prepared in accordance with the following recipe:

| | |
|---|---|
| Terminally carboxylated polyisobutylene, grams (equivalent weight 956) | 6.0 |
| Tris[1-(2-methyl)aziridinyl]phosphine oxide, grams (equivalent weight 72.4) | 0.57 |
| Ammonium perchlorate, grams | 11.0 |

The terminally carboxylated polyisobutylene and tris[1-(2-methyl) aziridinyl]phosphine oxide were mixed in a beaker and warmed to a temperature of 70°C in an oven and the ammonium perchlorate was gradually added in increments to the binder until all eleven grams had been added, producing as a result 62.5 percent oxidizer loading. The mixture was subsequently degassed at 70°C in a vacuum oven and loaded into a micro motor. The exothermic mixture produced a propellant grain weighing 9.32 grams which was cured for seven days at 70°C. The micro motor was fired using a hot wire igniter and produced a combustion chamber pressure of 340 psi.

EXAMPLE 3

The following formulation was employed to prepare twelve grains for a ballistic test rocket motor:

| Ingredient | Percent by weight |
|---|---|
| Terminally carboxylated polyisobutylene (equivalent weight 951) | 12.33 |
| Tris 1-(2-methyl)aziridinyl phospine oxide (equivalent weight 75) | 1.17 |
| Paraffin oil | 1.67 |
| Dioctyl adipate | 0.83 |
| Ammonium perchlorate | 68.00 |
| Aluminum powder | 16.00 |

Each of four batches was prepared at 160°F in a one-gallon vertical mixer, then cast in the form of perforated, case-bonded grains with outside diameter of 4.50 inches, length of 8.125 inches, web thickness of 0.600 inches and weight of approximately 3.85 lbs. The grains were cured for five days at 160°F before being installed in the rocket motor and tested. Tests were performed at nominal chamber pressures of 500, 1,000 and 1,500 psia at each of the following initial grain temperatures: −50°F, 50°F, 160°F and 300°F. From the results of tests at 50°F, the following burning rate expression was derived:

$$r_b = 0.196(Pc/1000)^{0.30},$$

where $r_b$ is the burning rate in inches per second and $Pc$ is the average chamber pressure in psia. From the results of tests at the other temperatures, the temperature sensitivity of burning rate ($\pi_k$) was determined to 0.11 percent/°F. The average values of characteristic exhaust velocity ($c^*$) and ideal specific impulse were determined to be 5,052 ft/sec and 237.3 sec., respectively.

Of the aforementioned constituents for formulating the above exothermic mixtures, all are currently available from chemical suppliers, with the exception of terminally carboxylated polyisobutylene. Consequently, the proper synthesis of this polymer will be discussed in detail. One preferred method for synthesis of this polymer calls for, broadly, the copolymerization of isobutylene and a conjugated diolefin catalyzed by a Lewis acid to form an intermediate copolymer which is then subjected to carefully controlled ozonolysis and oxidation to effect chain scission at each double bond and create carboxylic acid terminal groups on the resulting shorter chains.

Formulation of the intermediate copolymer proceeds according to reaction (1).

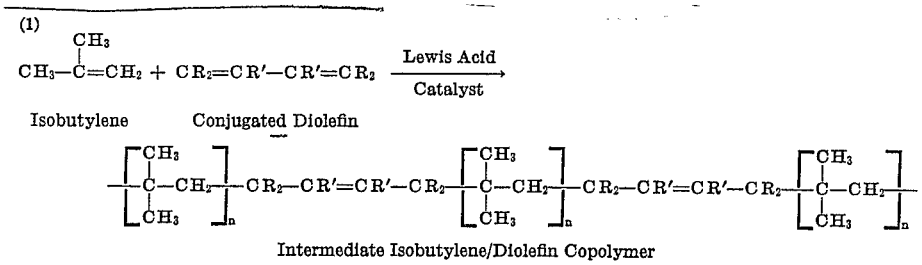

Intermediate Isobutylene/Diolefin Copolymer

The substituents of the conjugated diolefin which are designated $R$ may be hydrogen atoms or lower alkyl groups and need not all be identical. The substituents designated $R'$ may be hydrogen atoms or methyl groups and also need not be identical. In general, it is preferred that all, or at least most, of the $R$ and $R'$ substituents be hydrogen atoms. All of the acyclic, conjugated diolefins cited by Thomas and Sparks in U.S. Pat. No. 2,356,128 may be employed in the present invention. Suitable conjugated diolefins include but are not limited to: butadiene, 1,3-pentadiene, 2,4-hexadiene, isoprene, and 2,3-dimethyl-1,3-butadiene.

Although boron trifluoride, $BF_3$, and aluminum chloride, $AlCl_3$, are preferred catalysts for the copolymerization, a wide variety of other Lewis acid catalysts may be employed such as those described in C. E. Schildknecht, "High Polymers Vol. X," Polymer Processes, p. 201, Interscience, New York, 1953.

Carefully controlled ozonolysis of the intermediate copolymer synthesized by reaction (1) and oxidation of the ozonolysis product leads to formation of the terminally carboxylated polyisobutylene of the present invention. For copolymers of isobutylene with conjugated diolefins in which all $R'$ groups are hydrogen atoms (e.g., butadiene, 1,3-pentadiene and 2,4-hexadiene) the two-stage ozonolysis-oxidation process may be simply represented by reaction sequence (2) below. However, the actual course of the reactions is extremely complicated, and a useful product is obtained only under special reaction conditions.

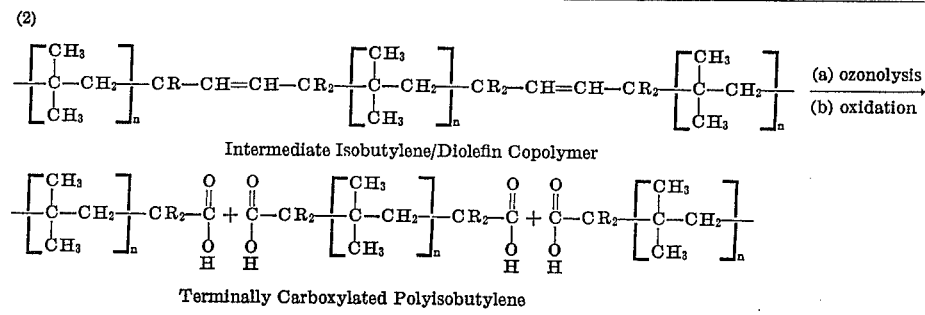

Terminally Carboxylated Polyisobutylene

For copolymers of isobutylene with conjugated diolefins in which one or both R' groups are methyl groups (e.g. isoprene and 2,3-dimethyl-1,3-butadiene) expecially rigorous oxidation procedures are required in step (b) of reaction sequence (2). This requirement stems from the necessity of conversion of intermediate acetyl (methyl ketone) terminal groups to carboxylic groups as illustrated in the simplified reaction sequences (3) and (4).

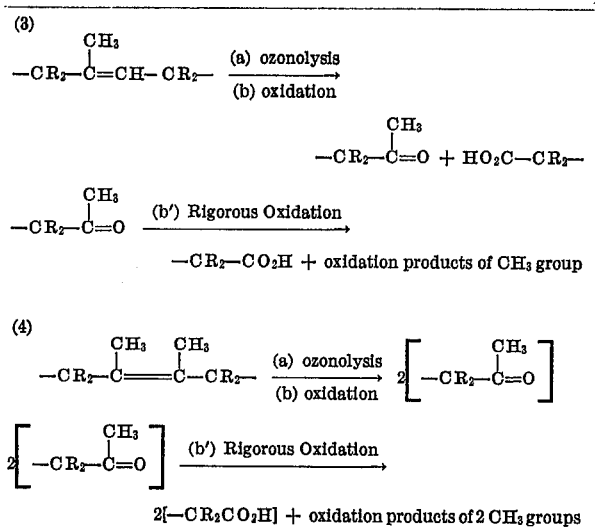

At elevated temperatures concentrated nitric acid is a suitable reagent for the rigorous oxidation. However, the haloform reaction (oxidation by salts of hypohalous acids) is preferred since it is specific for methyl ketones.

P. S. Bailey in Chemical Reviews Volume 58, page 925 (1958) describes presently accepted mechanisms for ozonolysis reactions and oxidation of ozonolysis products. These mechanisms suggest that a host of intermediate species are produced in reaction sequence (2). Simplified representations of likely structures are shown in reaction sequence (5). It is to be understood that in the polymeric system under consideration, the indicated interactions occur at many sites throughout a macromolecular polymer.

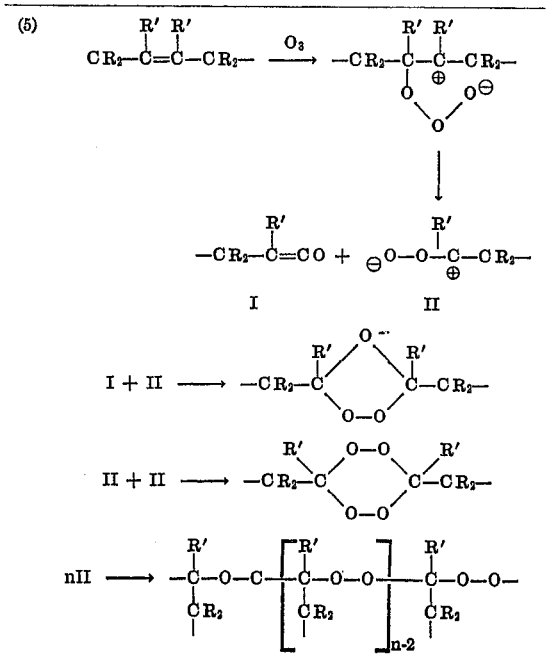

The complex species resulting from reaction sequence (5) can decompose thermally or react under a variety of conditions to produce terminal groups other than carboxylic acid groups. Among the undesirable species that may be produced even under nominally oxidizing conditions are hydrocarbons and ketones as well as uncharacterized condensation products and tars. The effect of such undesired side reactions is to reduce the average carboxylic acid functionality of the product below the ideal value of two. Resulting species of low functionality are difficult or impossible to separate from desirable species. Although it is well recognized in the art (e.g. P. J. Flory, "Principles of Polymer Chemistry," Chapter IX, Cornell University Press, Ithaca, 1953) that an exact lower limit of useful average functionality cannot be specified with certainty in polymeric materials such as that of present invention, it is well accepted that any decrease in functionality results in decreased capability of being cross-linked (curability) and degraded physical properties of the cured composition. In fact, a number of ordinarily acceptable oxidation procedures have been found to lead to products which cannot be cured. Since such reactions are completely unsuitable for the purposes of this invention, it is necessary that the detailed procedures below be carefully followed in order that one skilled-in-the-art may initially synthesize the liquid polymer. Appropriate modification of and variations on the basic processes set forth below will readily occur to the skilled artisan.

Initially, the intermediate copolymer of equation (1) is prepared by a method similar to that of R. M. Thomas and W. J. Sparks, U.S. Pat. No. 2,356,128. The following example illustrates the procedure using isobutylene and butadiene as co-monomers. A one-liter, four-necked resin kettle is fitted with a sealed stirrer, gas inlet dip tube, sampling port with rubber septum closure, and a dry ice condenser. The apparatus is dried by purging with anhydrous nitrogen gas, and the kettle is then cooled by means of a dry ice-acetone bath. Through a $BaO\text{-}CaSO_4$ drying tube, the following gases are charged to, and condensed in, the resin kettle: methyl chloride, 300 gm.; isobutylene, 42 gm.; 1,3-butadiene, 176 gm. Small increments of boron trifluoride gas are added to the stirred mixture until gas-liquid chromatographic analysis of the reaction mixture (sampled through the rubber septum) indicates conversion of 25–50 per cent of the isobutylene. The reaction is then positively terminated by addition of 25 ml of methanol which has been cooled to the temperature of the reaction mixture. The dry ice trap and the kettle cooling bath are removed, and volatile constituents of the reaction mixture are allowed to evaporate. The polymer residue is removed from the kettle by use of 200 ml of carbon tetrachloride solvent, and all volatile constituents are then removed by use of a rotating evaporator. The yield of solventfree copolymer is 10–20 gm with average molecular weight greater than 40,000 by viscometric measurements. On the basis of monomer consumption and reaction with ozone, the copolymer contains approximately 97 per cent by weight isobutylene and 3 per cent by weight butadiene.

This intermediate rubbery copolymer is converted to a liquid polymer of the present invention by the following procedure. The total product of the foregoing copolymerization is dissolved in 200 ml of carbon tetrachloride, and the solution is placed in a gas absorption flask equipped with a fritted glass inlet tube. The flask is placed in an ice bath and a stream of oxygen gas containing 2.7 per cent by weight ozone is passed through the solution at a rate of 0.016 cubic feet per minute for a period of three hours or approximately one hour after the blue color of unreacted ozone is discernible in the gas absorption flask. The flow of ozone is terminated and the reaction mixture is freed of excess ozone by purging with pure oxygen gas. The reaction mixture is placed in a 500 ml flask equipped with stirrer and thermometer. To the vigorously stirred solution, 50 ml. of fuming nitric acid (specific gravity 1.49–1.50) is added drop-wise at such a rate that the temperature does not exceed 35° C. After the addition of nitric acid is complete, stirring is continued for an additional hour. The reaction mixture is extracted five times with 200 ml. portions of a saturated aqueous solution of sodium chloride, and the extracts are discarded. The remaining carbon tetrachloride solution is dried first over anhydrous sodium sulfate and finally by passage through a column of activated silica gel. The dried solution is stripped of solvent by means of a rotating evaporator, and the product is freed of residual solvent by passage through a wiped film molecular still at a wall temperature of 100° C and a pressure of 50 microns. The resulting product is 10–15 gms. of terminally carboxylated polyisobutylene of approximately 2,000 molecular weight (number average by vapor pressure osmometry), and 1,000 equivalent weight (by titration with standard base). The infrared spectrum of the product differs from that of polyisobutylene in only one important respect: an additional absorption at 1,715 cm$^{-1}$ appears. This is characteristic of the C=O stretching frequency of carboxyl groups. As shown in Table I below, the product has the following viscosity-temperature properties as determined with a Brookfield RVT 7-Speed Viscometer equipped with a Helipath TF spindle.

TABLE I

| Temperature, °F | Viscosity, Poises |
| --- | --- |
| 69 | 8000 |
| 104 | 880 |
| 144 | 95 |
| 204 | 13 |

The following example is provided to illustrate required modifications of the synthesis when one R' group of the conjugated diolefin (Reaction 1) is a methyl group.

Using the apparatus described in the preceding example, a copolymer of isobutylene and isoprene is prepared. The technique of preparation differs from the foregoing procedure only in the following respects. The cooled resin kettle is charged with 250 ml. of methyl chloride and 63 gm of isobutylene. Isoprene (8.16 gm.) is then added through the rubber septum by means of a syringe. Small increments of boron trifluoride gas are added to the stirred mixture until approximately 30 per cent of the isobutylene is converted to polymer. At this point the reaction is terminated by addition of cold methanol. The resulting copolymer is worked up in the manner described previously.

Conversion of the copolymer of isobutylene and isoprene to terminally carboxylated polyisobutylene requires the following modifications of the previously described procedure. The copolymer is dissolved in a solution of 50 ml. of glacial acetic acid in 150 ml. of carbon tetrachloride. After ozonization is complete, 50 ml. of an 88 per cent by weight solution of formic acid in water and 25 ml. of a 30 per cent by weight solution of hydrogen peroxide in water are added to the reaction mixture. The mixture is refluxed for two hours and then cooled to room temperature. The carbon tetrachloride phase is separated and repeatedly washed with a saturated aqueous solution of sodium chloride until the washings are neutral. The carbon tetrachloride solution is then dried over anhydrous sodium sulfate and then freed of solvent in a rotating evaporator. The product is redissolved in 50 ml. of 1,4-dioxane, and the solution is added drop-wise with stirring to 0.02 mole of sodium hypobromite solution (prepared as described in "Organic Syntheses," H. Gilman, Editor, Collective Vol. I, p. 526, John Wiley and Sons, New York, 1941.) Throughout the addition and for one hour thereafter the stirred mixture is maintained at a temperature below 10°C. The stirred mixture is allowed to warm to room temperature, and after two hours is heated to the reflux temperature and so maintained for 30 minutes. The mixture is cooled to room temperature, carefully acidified with concentrated hydrochloric acid and extracted with carbon tetrachloride. The extract is dried over anhydrous sodium sulfate and then freed of solvent in a rotary evaporator. The product, terminally carboxylated polyisobutylene, has a molecular weight of 1,445 (number average by vapor pressure osmometry) and an equivalent weight of 669 gm. per carboxyl group.

A variety of cross-linking agents are suitable for curing the liquid polymers of the present invention. A review of method of curing carboxyl-terminated polymers has been published by H. P. Brown in Rubber Chemistry and Technology, 36,931 (1963). Other suitable curatives are suggested in U.S. Pat. No. 3,074,917 by W. B. Reynolds, issued on Jan. 22, 1963.

An especially useful cured form of terminally carboxylated polyisobutylene may be prepared by admixture with 1.1 equivalents of tris[1-(2-methyl)aziridinyl]phosphine oxide and maintaining the mixture at 70°C for 48 hours.

Properties of the cross-linked polymer can be controlled by use of differing cross-linking agents, variation of cure stoichiometry and employment of plasticizers. Control also can be effected by alteration of the average molecular weight (chain length) of the terminally carboxylated polyisobutylene. Within wide limits, the average chain length (determined by the value of $n$ in equation 1) may be altered by changing the ratio of isobutylene to conjugated diene in the copolymerization reaction. Alternatively, it is possible to isolate polymer fractions of differing molecular weight by selective precipitation or gradient elution techniques (cf. R. W. Hall, "Fractionation of High Polymers," Techniques of Polymer Characterization, edited by P. W. Allen, pp. 47–53 Butterworths, London, 1959). When the value of $n$ in equation (1) exceeds about 250, the viscosity of the liquid polymer becomes so great as to interfere with manipulation and processing. On the other hand, when $n$ is three or less, cured compositions produced by ordinary cross-linking agents suffer from limited elasticity. Thus the preferred range of the value of $n$ is from 4 to 250 and optimum properties are usually obtained when $n$ is in the range of ten to 50.

The unexpected rapid change of viscosity of the liquid polymer with temperature shown in Table I makes the polymer most suitable for the preparation of exothermic mixtures such as those set forth above. At elevated temperatures, the low viscosity of the polymer facilitates wetting of the particulate material and therefore permits attainment of high solids loading. Then, when the mixture is cooled, the markedly increased viscosity of the polymer retards gravitational separation of suspended solid particles with densities which differ markedly from that of the matrix, thereby assuring mixture homogeneity.

Although mixtures containing terminally carboxylated polyisobutylene have been shown to be a preferred embodiment of the present invention, various iso-olefins and mixtures of iso-olefins may be employed in the synthesis of the binder-fuel constituent. The iso-olefins possess structures corresponding to the formula

in which $R_1$ and $R_2$ are lower alkyl groups preferably containing one to ten carbon atoms with the lower numbers preferred in order to avoid processing problems due to viscosity.

The aforementioned procedure for producing carboxyl termination of polyiso-olefins can also be extended to other polyolefins such as polyethylene and heteropolymers of mono-olefins. For example, a copolymer of ethylene and 1,3-butadiene in which the butadiene is incorporated predominantly by 1,4-addition can be cleaved and oxidized to produce a carboxyl terminated polyethylene having the following structure

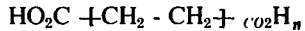

Another example is the cleaving and oxidation of a terpolymer of ethylene, butene -1 and 1,3-butadiene in which the butadiene is incorporated predominantly by 1,4-addition to produce a carboxy-terminated random copolymer having the following structure

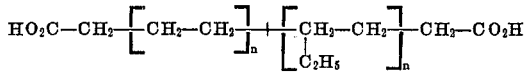

A salient feature of the binders of the present invention is that the linear chain of the polymerized mono-olefin described hereinabove be terminated at both ends by carboxyl groups.

It has been disclosed above that ammonium perchlorate, and ammonium nitrate are typical suitable oxidizers for use in combination with the unique binder of the present invention; however, it is to be understood that a large variety of oxidizers may be used therewith to produce the desired results. It has been found that the binder of the present invention is uniquely adapted for use with a large variety of highly reactive oxidizer materials which normally cannot be added to conventional binders such as those based on polybutadiene and polyisoprene. For example, it is well known that a number of the more reactive oxidizers in combination with conventional binders produce serious degradation of the binders, thereby destroying their physical properties and rendering them substantially unusable for the intended applications. However, it has been found that by using the binder of the present invention the reactive oxidizers do not seriously degrade the binder.

Although specific quantities of oxidizer are shown in the above examples, a wide range of oxidizer loading is permissible. Since the binder is capable of sustaining combustion in atmospheric oxygen, no lower limit for oxidizer loading exists for the mixtures of the present invention. As to the upper limit of oxidizer loading, this will vary according to the specific oxidizer and the burning characteristics desired for the system. Consequently, one skilled in the art can readily calculate by chemical thermodynamic consideration the quantity of oxidizer suitable for a given application wherein the binder of the present invention is used.

Moreover, a number of additives may be incorporated into the formulations of the present invention in order to bring about predictable effects. For example, energetic materials such as aluminum, lithium and other light metals may be added to the matrix. Also, burning rate accelerators and other combustion modifying agents may be used in the formulation.

Having thus described the invention and typical preferred embodiments thereof, it will be appreciated by those skilled-in-the-art that many variations and modifications in method for manufacture of the exothermic mixtures is feasible. It is understood that no undue limitations are to be drawn by reason of the examples set forth hereinabove, as considerable modification thereof is within the scope of the invention.

We claim:

1. A curable composition suitable for crosslinking to form a solid exothermic composition comprising particles of a solid inorganic oxidizing agent dispersed in a liquid synthetic linear polymer, said polymer consisting essentially of recurring structural units having the general formula:

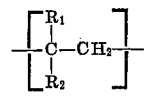

wherein $R_1$ and $R_2$ are selected from the group consisting of hydrogen and lower alkyl groups, which linear polymer is terminated at both ends by carboxylic acid functional groups.

2. The curable composition of claim 1 wherein the linear polymer contains n structural units and the value of n is in the range of 4 – 250.

3. The curable composition of claim 2 wherein the value of $n$ is in the range of 10 – 50.

4. The composition of claim 1 wherein both $R_1$ and $R_2$ are methyl groups.

5. The composition of claim 2 wherein both $R_1$ and $R_2$ are methyl groups.

6. The composition of claim 3 wherein both $R_1$ and $R_2$ are methyl groups.

7. In a solid propellant composition comprising a crosslinked polymeric matrix having particles of a solid inorganic oxidizing agent dispersed therethrough the improvement wherein said matrix consists essentially of synthetic linear polymer chains having a backbone of the general structural formula:

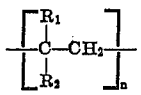

wherein $R_1$ and $R_2$ are selected from the group consisting of lower alkyl groups and hydrogen and $n$ is in the range of 4 to 250, which linear polymer chains are linked at both ends to other of said linear polymer chains by the reaction product of a carboxylic acid group and a crosslinking agent.

8. The composition of claim 7 wherein n is in the range of from 10 to 50.

9. The composition of claim 7 wherein both $R_1$ and $R_2$ are methyl groups.

10. The composition of claim 7 wherein said cross-linking agents are selected from the group consisting of polyfunctional aziridinyl and epoxy compounds.

11. An exothermic composition comprising particles of solid inorganic oxidizing agent dispersed within a binder matrix, said matrix consisting essentially of synthetic linear polymer chains consisting of recurring structural units of the general formula:

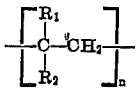

wherein $R_1$ and $R_2$ are selected from the group consisting of hydrogen and lower alkyl groups, which linear polymer chains are linked at both ends to other of said chains by the reaction product of a carboxylic acid group and a crosslinking agent.

12. The composition of claim 11 wherein said polymer chains contain n recurring structural units and $n$ is in the range of from 4 to 250.

13. The composition of claim 12 wherein $n$ is in the range of 10 to 50.

14. The composition of claim 12 wherein both $R_1$ and $R_2$ are methyl groups.

15. An exothermic composition comprising particles of a solid inorganic oxidizing agent dispersed within a polymeric matrix, said matrix being an elastomer formed by cross-linking the product produced by co-polymerizing a mono-olefin of the general formula:

wherein $R_1$ and $R_2$ are selected from the group consisting of hydrogen and lower alkyl groups and $R_3$ is a lower alkylidene group, with a conjugated diene, the mole ratio of the copolymerized mono-olefin to the co-polymerized conjugated diene being in the range of from 4:1 to 250:1, cleaving the copolymer so produced at the double bonds, oxidizing the termini of the cleavage products to carboxyl groups and recovering the carboxy-terminated product.

16. The composition of claim 15 wherein said mono-olefin is isobutylene.

* * * * *

UNITED STATES PATENT OFFICE
CERTIFICATE OF CORRECTION

Patent No. 3,837,939      Dated Sept. 24, 1974

Inventor(s) Toshio William Nakagawa and Thomas P. Rudy

It is certified that error appears in the above-identified patent and that said Letters Patent are hereby corrected as shown below:

In the Title, "CONTAINNG" should read ---CONTAINING---;

column 9, lines 21-24, structural formula

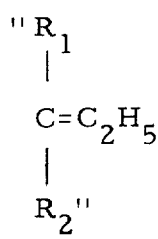     should read     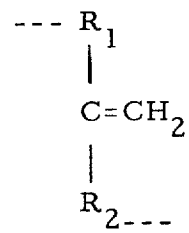

column 9, line 39, structural formula

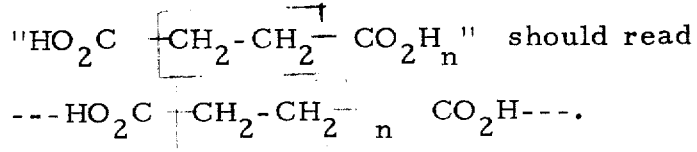 should read

---$HO_2C \; \ulcorner CH_2-CH_2 \urcorner_n \; CO_2H$---.

Signed and sealed this 10th day of December 1974.

(SEAL)
Attest:

McCOY M. GIBSON JR.      C. MARSHALL DANN
Attesting Officer      Commissioner of Patents